US008727457B2

(12) United States Patent
Marshall et al.

(10) Patent No.: US 8,727,457 B2
(45) Date of Patent: May 20, 2014

(54) COFFEE-CARTRIDGE STORAGE SYSTEM (76) Inventors: Aaron Daniel Marshall, Uniontown, OH (US); Walter G. Berry, Frisco, TX (US)

( * ) Notice: Subject to any disclaimer, the term of this patent is extended or adjusted under 35 U.S.C. 154(b) by 99 days.

(21) Appl. No.: 13/463,918

(22) Filed: May 4, 2012

(65) Prior Publication Data
US 2012/0313496 A1 Dec. 13, 2012

Related U.S. Application Data (60) Provisional application No. 61/482,363, filed on May 4, 2011.

(51) Int. Cl.
*A47B 67/02* (2006.01)
(52) U.S. Cl.
USPC ....... 312/246; 312/348.3; 312/323; 211/59.3; 211/184; 211/74
(58) Field of Classification Search
USPC .............. 312/348.3, 321, 118–120, 122–123, 312/126–132, 245–246, 323, 330.1; 211/59.3, 184, 74
See application file for complete search history.

(56) References Cited

U.S. PATENT DOCUMENTS

| | | | | |
|---|---|---|---|---|
| 874,087 A * | 12/1907 | Kinsey | | 312/212 |
| 2,839,349 A * | 6/1958 | Culver | | 312/323 |
| 3,698,782 A * | 10/1972 | Onori | | 312/350 |
| 3,729,242 A * | 4/1973 | Barney | | 312/107 |
| 4,478,337 A * | 10/1984 | Flum | | 211/59.2 |
| 4,685,574 A * | 8/1987 | Young et al. | | 211/59.2 |
| 5,221,002 A * | 6/1993 | Garganese | | 206/151 |
| 5,244,272 A * | 9/1993 | Thompson | | 312/334.23 |
| 5,325,765 A | 7/1994 | Sylvan et al. | | |
| 5,346,298 A * | 9/1994 | Headley | | 312/348.3 |
| 5,542,552 A * | 8/1996 | Yablans et al. | | 211/59.3 |
| 5,840,189 A | 11/1998 | Sylvan et al. | | |
| D408,679 S | 4/1999 | Potts et al. | | |
| 6,079,315 A | 6/2000 | Beaulieu et al. | | |
| 6,082,247 A | 7/2000 | Beaulicu | | |
| 6,142,063 A | 11/2000 | Beaulieu et al. | | |
| 6,182,554 B1 | 2/2001 | Beaulieu et al. | | |
| D513,572 S | 1/2006 | Schaffeld et al. | | |
| 7,140,703 B1 * | 11/2006 | Holdgate et al. | | 312/323 |
| 7,165,488 B2 | 1/2007 | Bragg et al. | | |
| D544,299 S | 6/2007 | Schaffeld et al. | | |
| 7,347,138 B2 | 3/2008 | Bragg et al. | | |
| 7,360,418 B2 | 4/2008 | Pelovitz | | |
| 7,377,162 B2 | 5/2008 | Lazaris | | |
| 7,398,726 B2 | 7/2008 | Streeter et al. | | |
| 7,469,792 B1 * | 12/2008 | Lin | | 211/74 |
| 7,513,192 B2 | 4/2009 | Sullivan et al. | | |
| 7,523,695 B2 | 4/2009 | Streeter et al. | | |
| 7,640,845 B2 | 1/2010 | Woodnorth et al. | | |
| D628,445 S * | 12/2010 | Snider | | D7/600.1 |
| D665,230 S * | 8/2012 | Snider | | D7/600.1 |
| 2004/0232092 A1* | 11/2004 | Cash | | 211/4 |
| 2005/0189310 A1* | 9/2005 | Richter et al. | | 211/59.3 |
| 2005/0199565 A1* | 9/2005 | Richter et al. | | 211/59.3 |

(Continued)

*Primary Examiner* — Hanh V Tran
(74) *Attorney, Agent, or Firm* — Cindy Murphy LLC (57) ABSTRACT

A storage system (10) for storing a plurality of single-serve-beverage cartridges (30). The system 10 includes a drawer (40) with compartment lanes (50) adapted to allow a plurality of the cartridges to be single-file situated therein. A slide (80) can be used to move the drawer (40) between a closed position and an opened position.

19 Claims, 10 Drawing Sheets

(56) References Cited

U.S. PATENT DOCUMENTS

| | | | |
|---|---|---|---|
| 2005/0258113 A1* | 11/2005 | Close et al. ............ 211/59.3 |
| 2006/0174773 A1 | 8/2006 | Taylor |
| 2006/0292012 A1 | 12/2006 | Brudevold et al. |
| 2007/0151938 A1* | 7/2007 | Burke ..................... 211/59.3 |
| 2008/0084144 A1* | 4/2008 | D'Ambrosio ............ 312/137 |
| 2008/0095904 A1 | 4/2008 | Sullivan et al. |
| 2008/0115674 A1 | 5/2008 | Huang et al. |
| 2008/0129161 A1* | 6/2008 | Menz et al. .............. 312/120 |
| 2008/0134902 A1 | 6/2008 | Zimmerman et al. |
| 2010/0024658 A1 | 2/2010 | Jacobs et al. |
| 2010/0303964 A1 | 12/2010 | Beaulieu et al. |

* cited by examiner

COFFEE-CARTRIDGE STORAGE SYSTEM

RELATED APPLICATION

This application claims priority under 35 USC §119(e) to U.S. Provisional Patent Application 61/482,363 filed on May 4, 2011. The entire disclosure of this provisional patent application is hereby incorporated by reference.

BACKGROUND

A single-serve coffee maker can comprise a brew chamber which is adapted to receive a cartridge containing a beverage medium. To brew a cup of coffee, the chamber is opened, the single-serve cartridge is inserted into chamber, and the chamber is closed to initiate brewing. The single-serve cartridges can be supplied in a variety of flavors and, in any event, a new cartridge is required for each cup of coffee brewed.

SUMMARY

A coffee-cartridge storage system is provided for use with a single-serve beverage maker. The system comprises a drawer that can fit under a cabinet and/or above the coffee machine, and a slide for moving the drawer between a closed position and an opened position. The drawer includes a series of compartment lanes in which cartridges are situated in a single-file fashion. In this manner, cartridges can be efficiently and effectively stored below a cabinet and/or above a beverage maker, even when vertical space is somewhat limited.

DESCRIPTION

Figure 1:
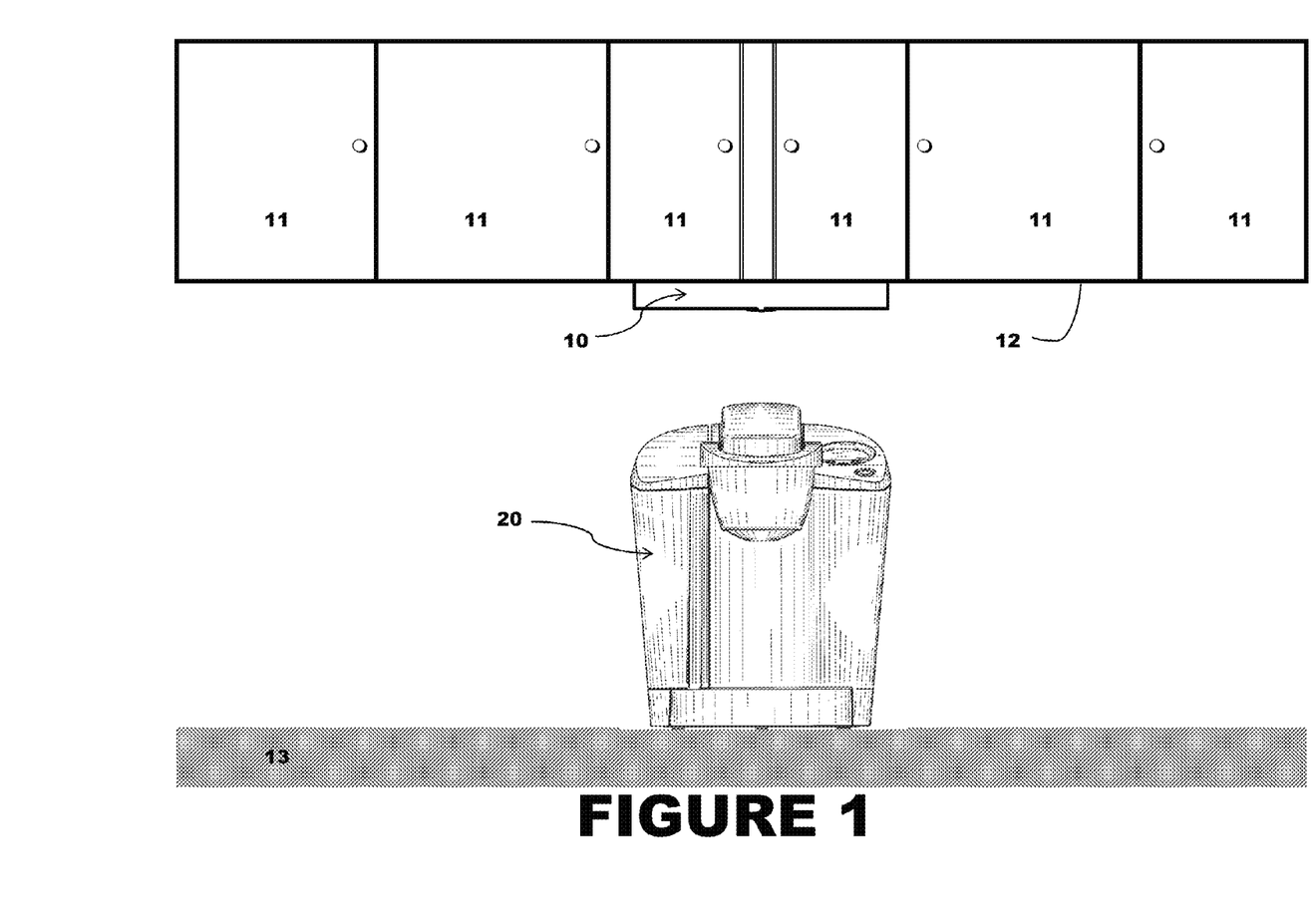
FIG. 1 shows the coffee-cartridge storage system mounted under a cabinet and over a counter on which a coffee maker is situated.

Referring now to the drawings, and initially to FIG. 1, a coffee-cartridge system 10 is shown situated just below a cabinet 11 (i.e., attached to its lower surface 12) and above a countertop 13. A single-serving coffee maker 20 is placed on the countertop 13 and below the cabinet 12. In the illustrated embodiment, the storage system 10 and the coffee maker 20 can be generally vertical aligned. The vertical space between the cabinet 11 and the coffee maker 20, and thus between the storage system 10 and the coffee maker 20, is somewhat limited.

Figure 2:
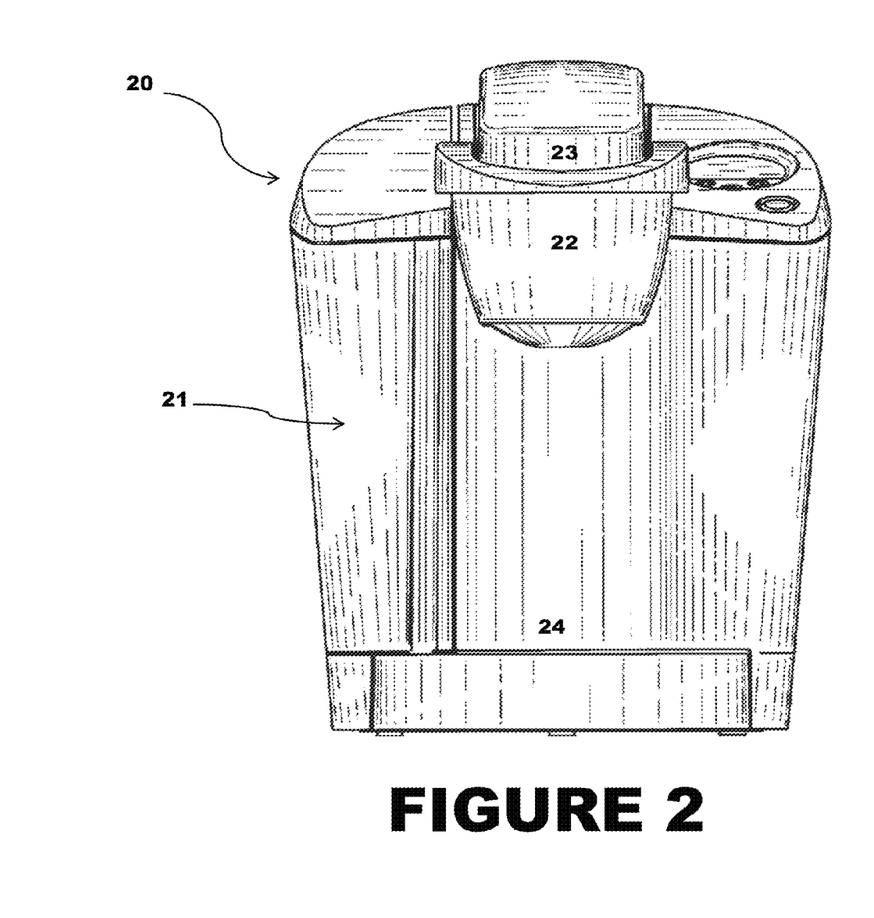
FIG. 2 shows the coffee maker and single-serve cartridges usable therein.

Referring now to FIG. 2, the single-serve coffee maker 20 generally comprises a housing 21 forming a brew chamber 22 and a lid 23 for opening and closing the chamber 22. The lid 23 can be movably attached to the housing 21 and can pivot upwards/downwards to open/close the chamber 22. If the lid 23 does pivot upwards to open, the vertical space above the coffee maker 20 must accommodate this movement.

To operate the coffee maker 20, the lid 23 is opened and one of the single-serve coffee cartridges 30 is placed in the brew chamber 22. The lid 23 is then closed to initiate the coffee-brewing process. Specifically, the cartridge 30 is pierced or otherwise converted into a brewing condition, and heated water is conveyed to the brew chamber 22. Coffee is dispensed from the brew chamber 22 into a mug positioned on a cup dock 24 positioned therebelow.

Figure 3:
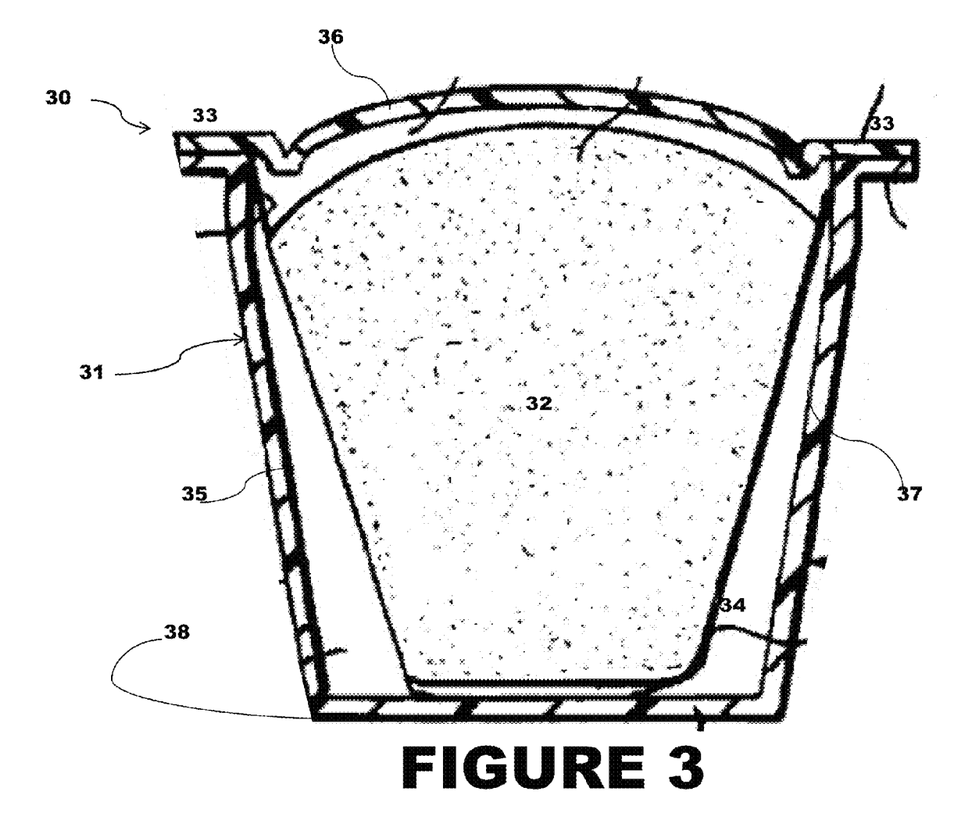
FIG. 3 shows a single-serve coffee cartridge in more detail.
Figure 4:
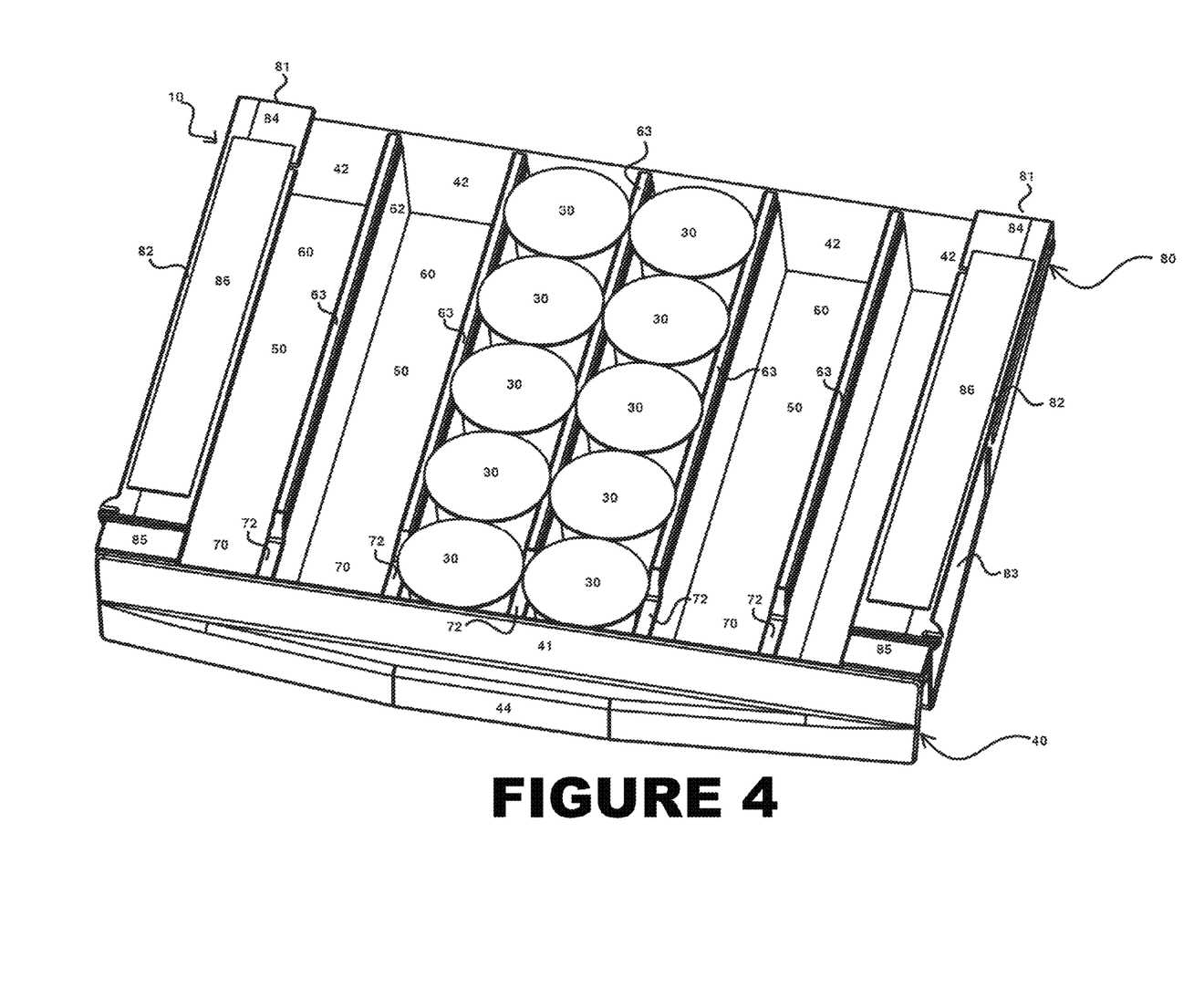
FIGS. 4-6 show the storage system prior to installation.
Figure 5:
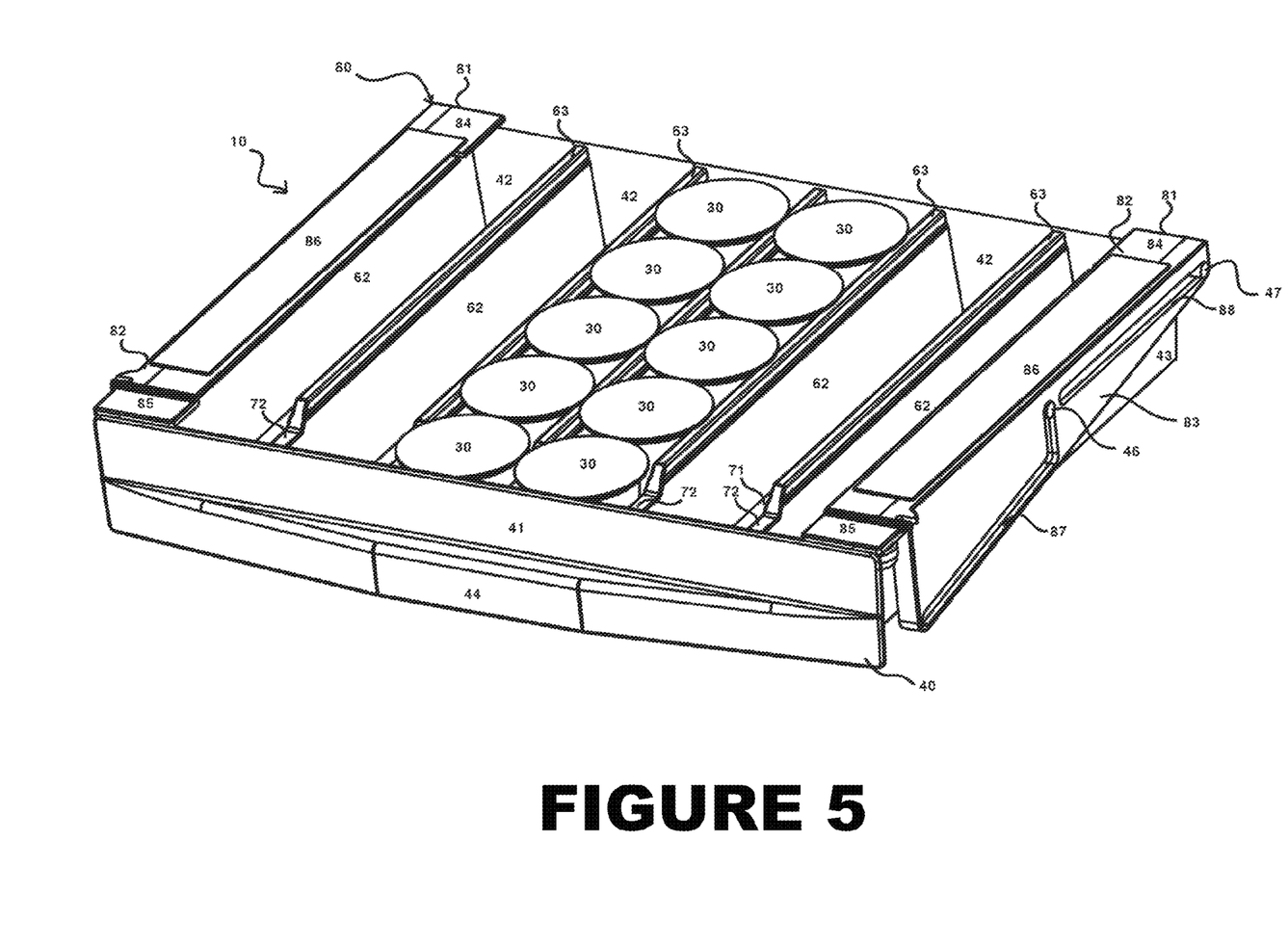
Figure 6:
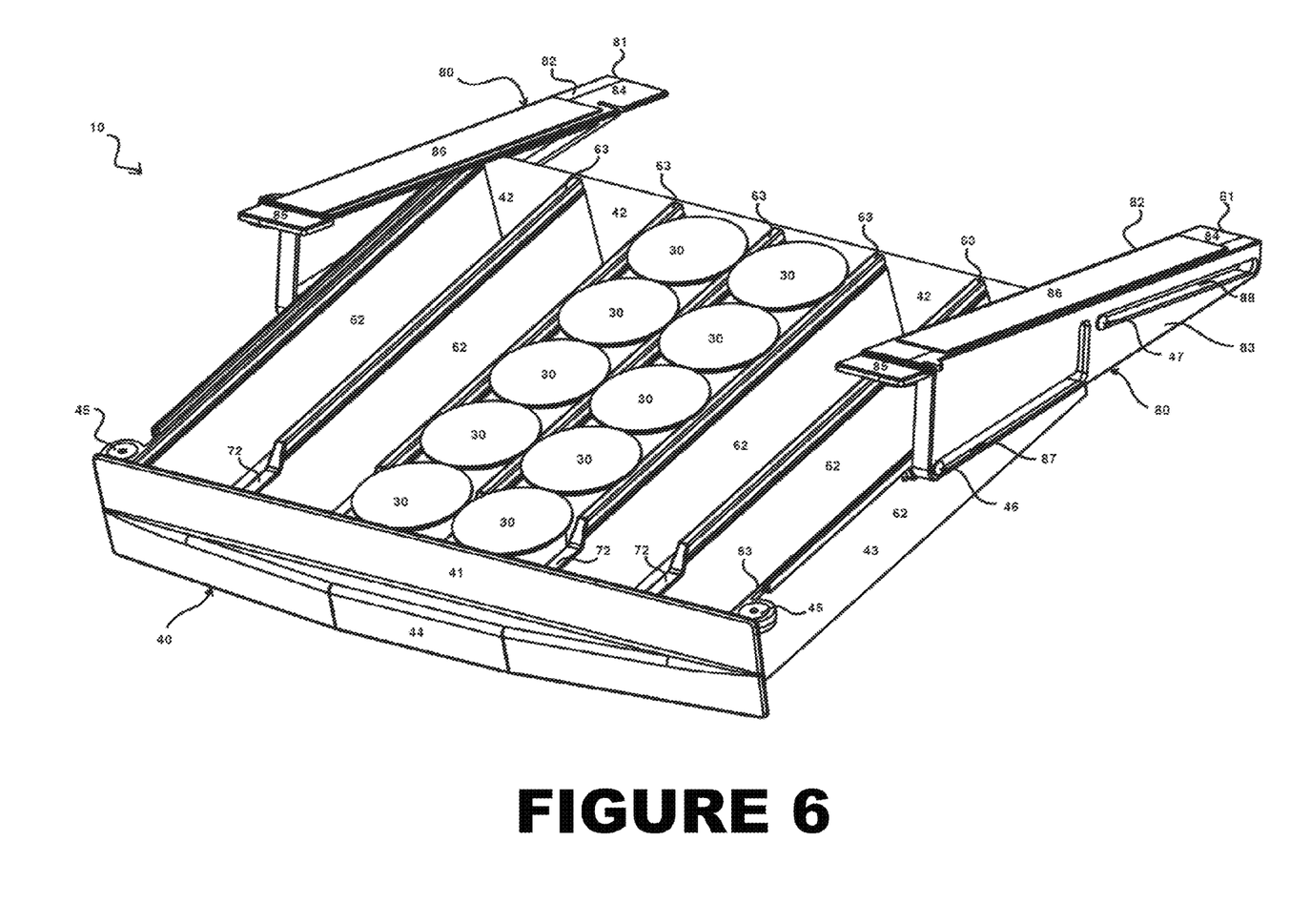
Figure 7:
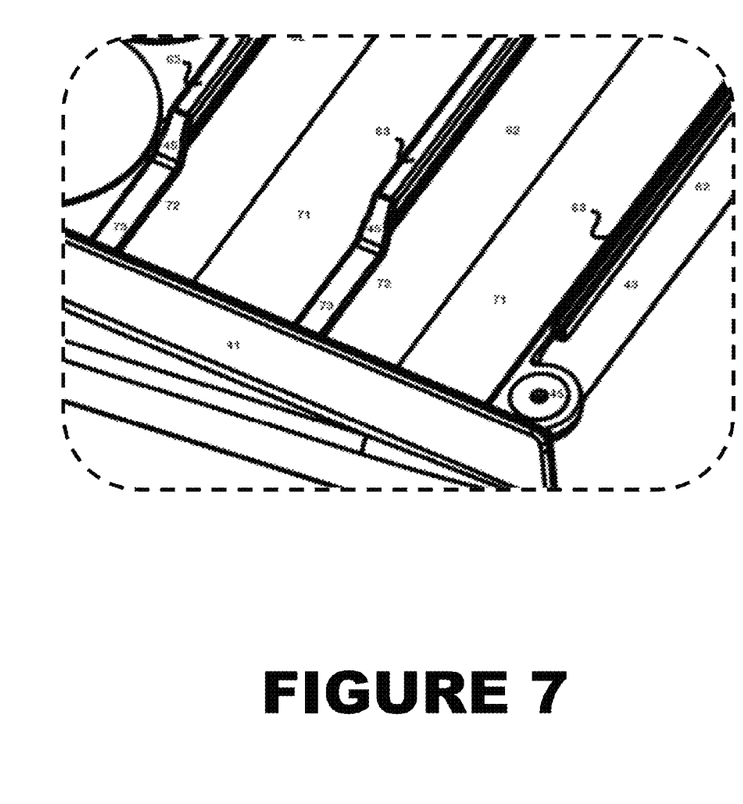
FIGS. 7-10 show close-up details of the storage system.
Figure 8:
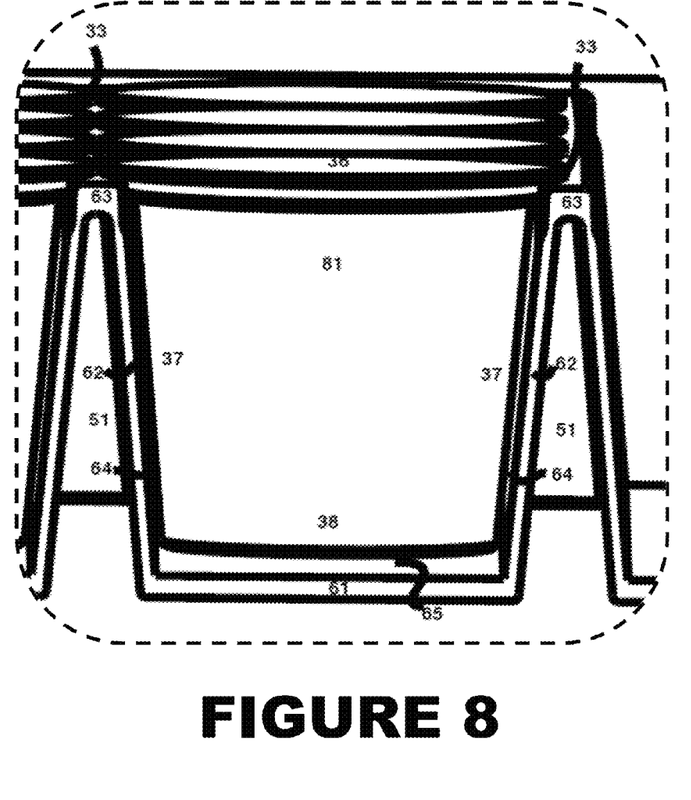
Figure 9:
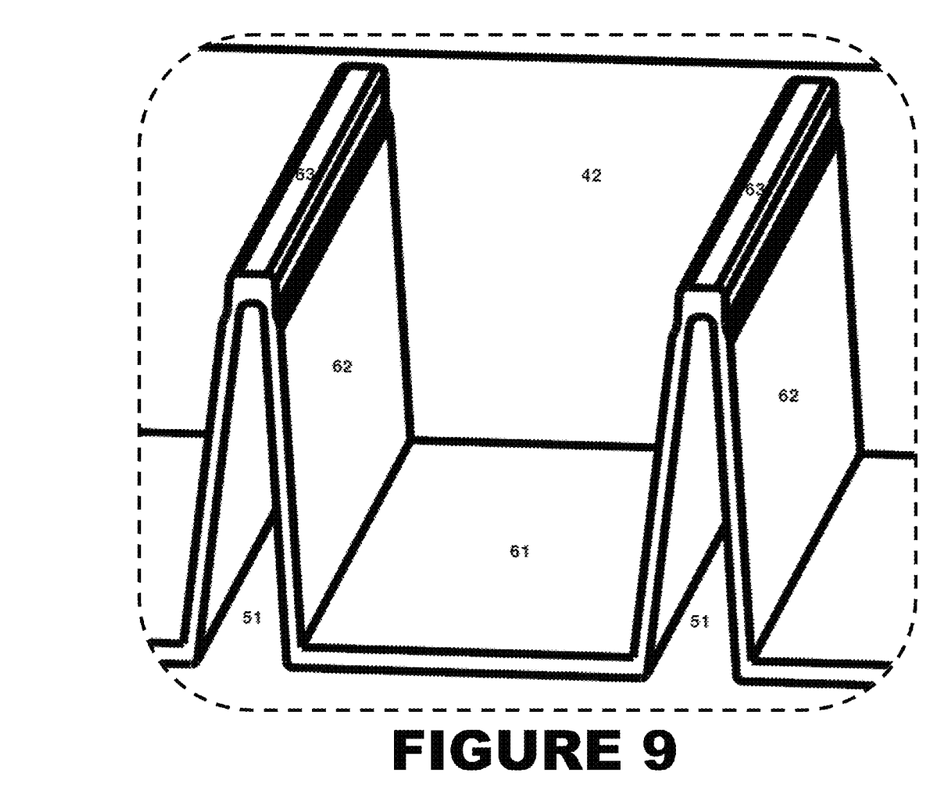
Figure 10:
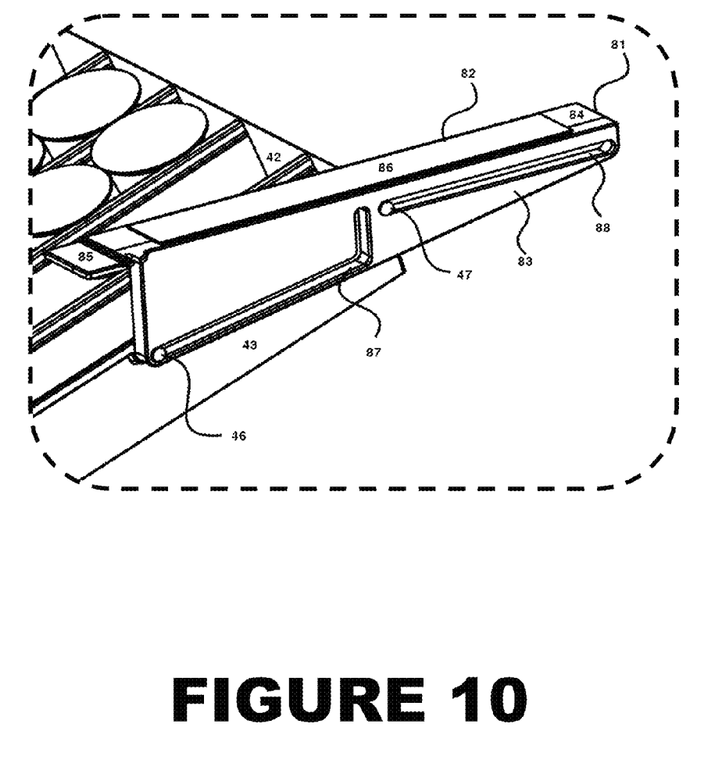

Referring now to FIG. 3, a single-serve coffee cartridge 30 is shown in more detail. The cartridge 30 comprises a generally cylindrical container 31, a beverage medium 32 sealed within the container 31, and a rim 33 encircling the upper edge of the container 31. A filter 34 can also be incorporated into the container 31 along with the medium 32.

The container 31 can comprise a base portion 35 having a top opening and a cover portion 36 sealing this opening. The base portion 35 can have a gradually tapering truncated conical side wall 37 closed at one end by a circular bottom wall 38 and defining the top opening at the opposite end.

The base portion 35 can be made of relatively rigid material, such as thermoformed polymeric laminate, and the cover portion 36 can be made of more flexible material, such as nylon-aluminum film. Both portions 35/36 can be impermeable and imperforate, and yieldably pierceable if necessary for conversion to the coffee-brewing condition. The rim 33 can be formed from a folded upper edge lip of the base portion 35 and peripheral edge of the cover portion 36 which is heat-sealed or otherwise bonded thereto.

Suitable single-serve coffee makers 20 and suitable single-serve cartridges 30 include those sold by Keurig Incorporated, and/or those disclosed in U.S. Pat. Nos. 7,165,488, 7,347,138, 7,513,192, US20080095904, US20080115674, US20080134902, and/or US20100024658.

Although this description has focused somewhat on coffee (e.g., coffee maker 20 and single-serve-coffee cartridge 30), the storage system 10, the maker 20, and the cartridge 30 are more generally directed to beverages. Thus, the beverage medium 32 can be coffee, tea, evaporated milk, and/or any other powdered concentrate.

Referring now to FIGS. 4-10, the coffee-cartridge storage system 10 is shown. The system 10 comprises a drawer 40 comprising a front side 41, a rear side 42 and lateral sides 43. A handle 44 can be associated with the front side 41 to move the drawer 40 between a closed position and an opened position. Magnetic locking patches 45 can be located on the top of the lateral sides 43, just rear of the front side 41. Guide pegs 47 and 48 can project outwardly from the lateral sides 43.

The drawer 40 comprises a series of compartment lanes 50 extending in the front-rear direction. The drawer 40 can include at least three, at least four, at least five, and/or at least six compartment lanes 50. Triangular voids 51 can be located between neighboring compartment lanes 50.

The compartment lanes 50 each include a stocking region 60. Each stocking region 60 has a floor 61 and a pair of partitions 62, with one partition extending upwardly from each longitudinal edge 61 of the floor 61. Rim-resting ledges 63 extend laterally between the top edges of adjacent partitions in neighboring compartment lanes 50.

The floor 61, the partitions 62, and the ledges 63 are adapted to allow a plurality of the cartridges 30 to be single-file situated in the stocking region 60 of each compartment lane 50. The compartment lanes 50 and/or the stocking regions 60 can be sized to accommodate at least three cartridges 30, at least four cartridges 30, or even more cartridges 30, depending upon the dimensions of the cabinet 11.

The floor 61, the partitions 62, and the ledges 63 are also adapted to minimize the frictional engagement of the cartridges 30 with the drawer 40. More particularly, the rims 33 of the cartridges 30 rest on the ledges 63, but the rest of the cartridges 30 do not touch the drawer 40. There is a gap 64 (e.g., at least 1 mm) between the floor 61 and the bottoms 38 of the cartridge containers 31. And there is a clearance 65

(e.g., at least 1 mm) between the partitions 62 and sides 37 of the cartridge containers 31. To further minimize frictional engagement, the rim-resting ledges 63 can have a rounded contour.

As was indicated above, the vertical space available under the cabinet 11 is often somewhat limited. To this end, the height of the partitions 62 can be just slightly larger than that of the cartridges 30. For example, the partition height can be less than six centimeters. And the partitions 62 can slope outwardly from the floor 61 to form a trapezoidal space for the cartridges 30.

The compartment lanes 50 can each also include a dispensing region 70, located forward of its stocking region 60. Each dispensing region 70 can be adapted to hold one cartridge 30 for easy removal when the drawer 40 is in the opened positioned.

Each dispensing region 70 can comprises a floor 71 flush with the floor 61 of the corresponding stocking region 60. A fence 72 can extend upwardly from each longitudinal edge of this floor 71. The fences 72 can be contiguous with the partitions 62, but of lesser heights. For example, each fence 72 can include a short forward section 73 and a ramped section 74 leading from the corresponding partition 62 thereto.

The compartments 50 (and thus the floor 61, the partitions 62, the ledges 63, the floor 71, and the fences 72) can be molded from a plastic sheet folded in an almost accordion-like manner. If so the, floors 61, the partitions 62, the floor 71, and the fences 72 will have approximately the same thickness. The triangular voids 51 will be located below the rim-resting ledges 63 and between adjacent partitions 62 of neighboring compartment lanes 50.

The coffee-cartridge storage system 10 can also comprise a slide 80 for moving the drawer 40 between a closed position and an opened position. In the closed position, the floors 61/71 are oriented horizontally and are positioned under the cabinet 11. And in the opened position, the floors 61/71 are slanted downwards and extend outwardly from the cabinet 11.

The minimal frictional engagement of the cartridges 30 with the drawer 40 allow a relatively small downward slant to be used. For example, the opened drawer 40 can slant downwards less than 15°, less than 14°, less than 13°, less than 12°, and/or less than 11°, and still result in cartridges 30 from the stocking regions 60 sliding downward to the dispensing regions 70. This reduced slope further accommodates situations where vertical space beneath the cabinet 11 is somewhat limited.

The slide 80 can comprise, as illustrated, a pair of brackets 81. Each bracket 81 can include a horizontal panel 82 and a vertical panel 83 extending perpendicularly downward from an edge thereof to form an L-like cross-section. The brackets 81 can be symmetrically arranged so that the horizontal panels 82 face inwardly towards each other and the vertical panels 83 flank the drawer 40. And they can each be formed in one piece from a suitable material, such as metal or plastic.

The horizontal panels 82 can each comprise a cabinet-mounting platform 84 and dipped front flange 85. The mounting platform 84 can be affixed to the bottom surface 13 of the cabinet 12 with, for example, double-sided tape 86, whereby no installation tools are necessary. That being said, other affixing means (e.g., hook-and-loop strips, adhesive, nails, screws, etc.) are possible and contemplated.

The dipped front flange 85 can interact with the front side 41 of the drawer 40 when it is in the closed position to prevent it from being over-inserted. And the magnetic patches 45 on the drawer 40 can attach to the flange 85 to lock it in the closed position. If brackets 81 and/or flanges 85 are made of metal, no further attachments would be necessary to accomplish such magnetic locking. Otherwise, magnet patches can also be attached to the flanges 85.

The flank panels 83 can each have a right-triangular plan shape with the hypotenuse extending downward from the outer rear corner of the corresponding platform 84. Guide slots 87 and 88 can be provided on each of the flank panels 83 for coordination with the pegs 47 and 48 on the drawer 40. The front guide slot 87 can extend along the hypotenuse edge of the panel 83 from its lower front corner and then, at an intermediate location, extend upwardly. The rear guide slot 88 can extend along the upper edge of the flank panel 83, from just rear of the slot 87 to near the panel's rear corner.

One may now appreciate that the storage system 10 allows single-serve-beverage cartridges 30 to be efficiently and effectively stored below a cabinet and/or above a beverage maker, even when vertical space is somewhat limited. Although the system 10, the coffee maker 20, the cartridges 30, the drawer 40, and/or the slide 80, have been shown or described with respect to certain embodiments, it is obvious that equivalent alterations and modifications will occur to others skilled in the art upon the reading and understanding of this specification and the annexed drawings.

The invention claimed is:

1. A drawer and single-serve-beverage cartridges,
   wherein each cartridge has a container holding a beverage medium and a rim surrounding the top edge of the container;
   wherein the drawer comprises compartment lanes in which the single-serve-beverage cartridges are stored;
   wherein each compartment lane comprises a stocking region having a floor and a partition extending upwardly from each longitudinal edge of the floor;
   wherein rim-resting ledges extend laterally between top edges of adjacent partitions in neighboring compartment lanes; and
   wherein each compartment lane and the cartridges are dimensioned such that the, cartridges are single-file situated in the stocking region of each compartment lane, and supported solely by their rims resting on the ledges, with the rims of cartridges in neighboring compartments do not overlap each other, with a gap between the floor and the bottoms of the cartridge containers, and with a clearance between the partitions and the sides of the cartridge containers to minimize frictional engagement of the cartridges with the drawer.

2. A drawer and the single-serve-beverage cartridges as set forth in claim 1, comprising at least three compartment lanes.

3. A drawer and the single-serve-beverage cartridges as set forth in claim 2, comprising at least four compartment lanes.

4. A drawer and the single-serve-beverage cartridges as set forth in claim 3, comprising at least six compartment lanes.

5. A drawer and the single-serve-beverage cartridges as set forth in claim 2, wherein at least three cartridges are single-file situated in the stocking region of each compartment lane.

6. A drawer and the single-serve-beverage cartridges as set forth in claim 1, wherein the height of the partitions is less than two inches.

7. A drawer and the single-serve-beverage cartridges as set forth in claim 1, wherein the partitions slope outwardly from the floor to form a trapezoidal space within the stocking region.

8. A drawer and the single-serve-beverage cartridges as set forth in claim 1, wherein with the gap is at least 1 mm.

9. A drawer and the single-serve-beverage cartridges as set forth in claim 1, wherein the clearance is at least 1 mm.

10. A drawer and the single-serve-beverage cartridges as set forth in claim 1, wherein each compartment lane comprises a dispensing region located forward of its stocking region.

11. A drawer and the single-serve-beverage cartridges as set forth in claim 10, wherein each dispensing region is adapted to hold one cartridge.

12. A drawer and the single-serve-beverage cartridges as set forth in claim 10, wherein each dispensing region comprises a floor flush with the floor of the corresponding stocking region.

13. A drawer and the single-serve-beverage cartridges as set forth in claim 12, wherein each dispensing region comprises a fence extending upwardly from each longitudinal edge of its floor.

14. A drawer and the single-serve-beverage cartridges as set forth in claim 13, wherein the fences of each dispensing region are of a lesser height than the partitions of the corresponding stocking region.

15. A drawer and the single-serve-beverage cartridges as set forth in claim 14, wherein each fence includes a short forward section and a ramped section leading from the corresponding partition to the short forward section.

16. A drawer and the single-serve-beverage cartridges as set forth in claim 1, wherein the floor, the partitions, and the ledges are formed in one piece by a plastic sheet folded in an almost accordion-like manner to form the compartment lanes.

17. A storage system comprising the drawer and the single-serve-beverage cartridges set forth in claim 1 and a slide for moving the drawer between a closed position and an opened position.

18. A storage system as set forth in claim 17, wherein the floors of the compartment lanes are oriented substantially horizontal when the drawer is in the closed position; and wherein the floors of the compartment lanes are slanted downwards when the drawer is in the opened position.

19. A storage system as set forth in claim 17, also comprising a beverage maker, and wherein the slide is mounted directly above the beverage maker.

* * * * *